April 26, 1960

W. HOPPE ET AL 2,934,119

BREAD SLICING MACHINE

Filed June 4, 1956

INVENTORS
WILLIAM HOPPE
LAWRENCE W. SCHOPPEE

BY Chapin & Neal

ATTORNEYS

April 26, 1960 W. HOPPE ET AL 2,934,119
BREAD SLICING MACHINE
Filed June 4, 1956 15 Sheets-Sheet 2

INVENTORS
WILLIAM HOPPE
LAWRENCE W. SCHOPPEE
BY Chapin & Neal
ATTORNEYS

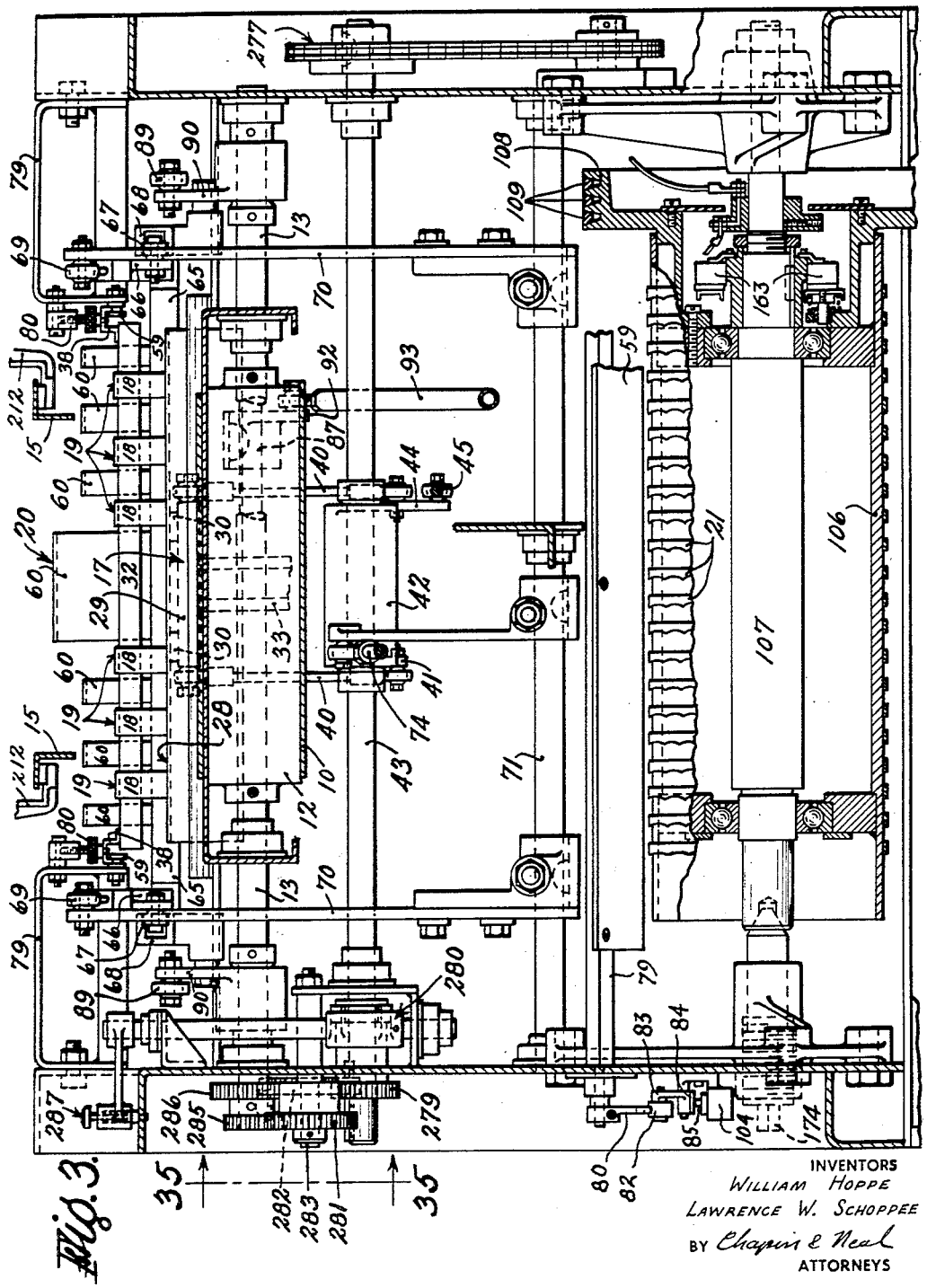

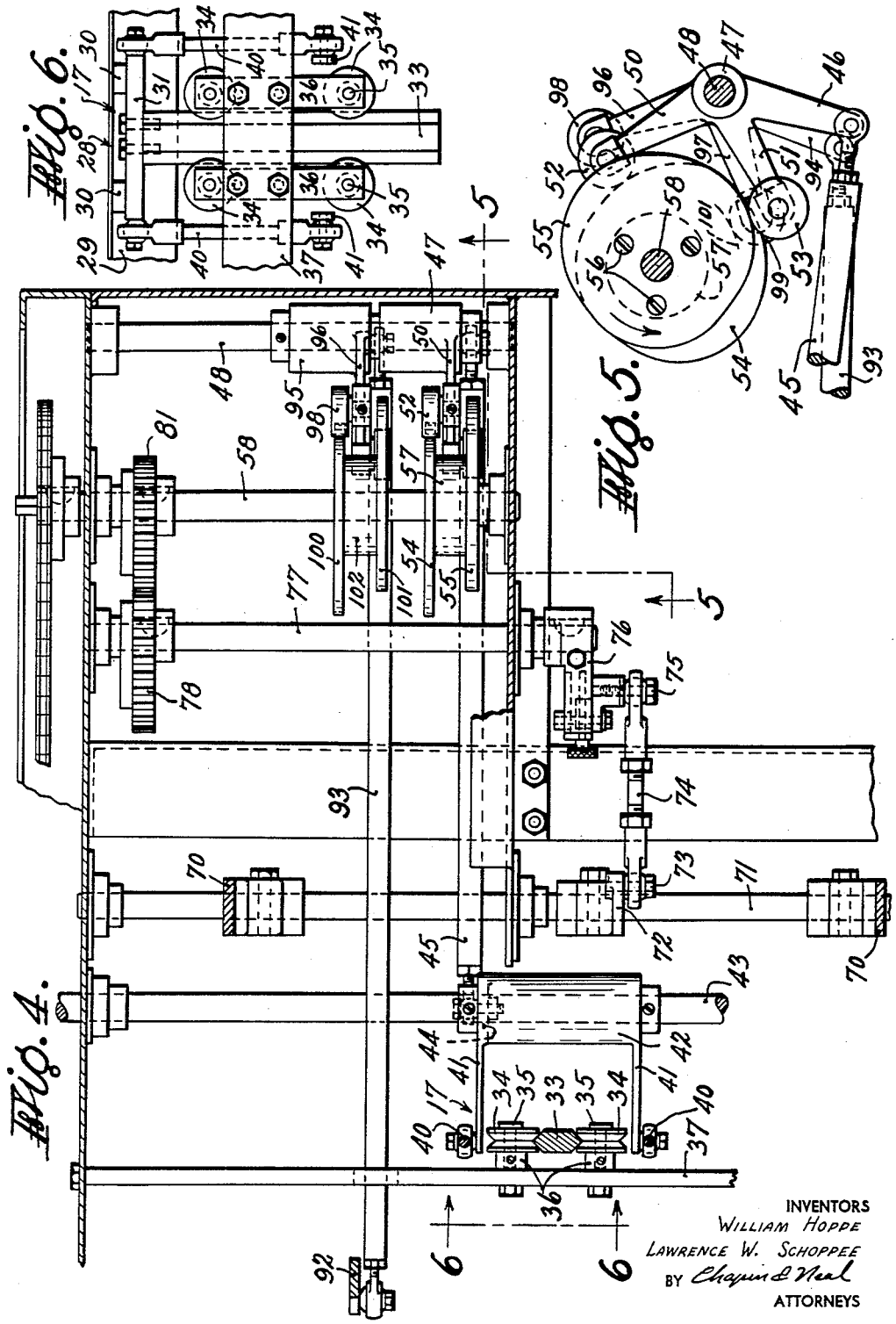

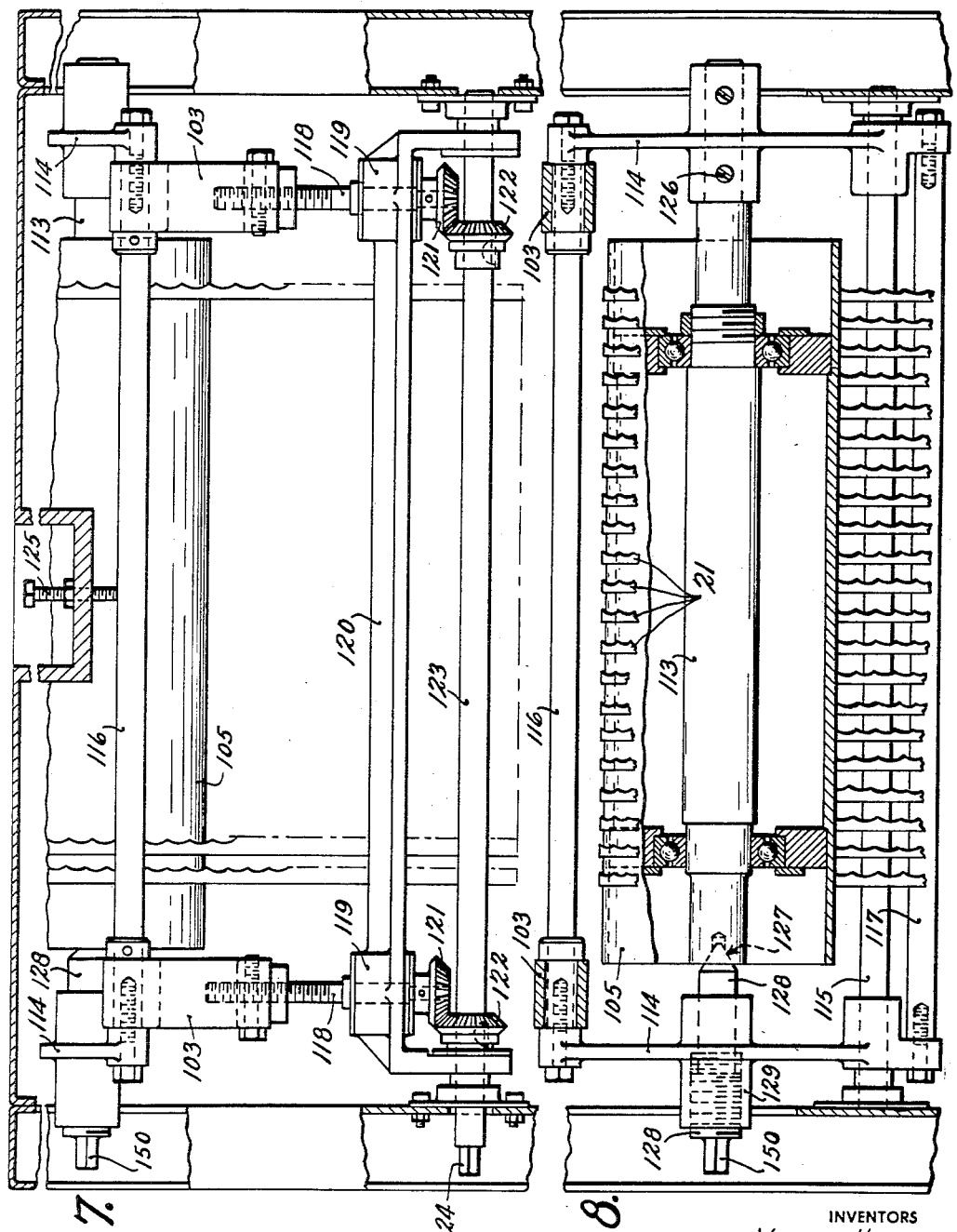

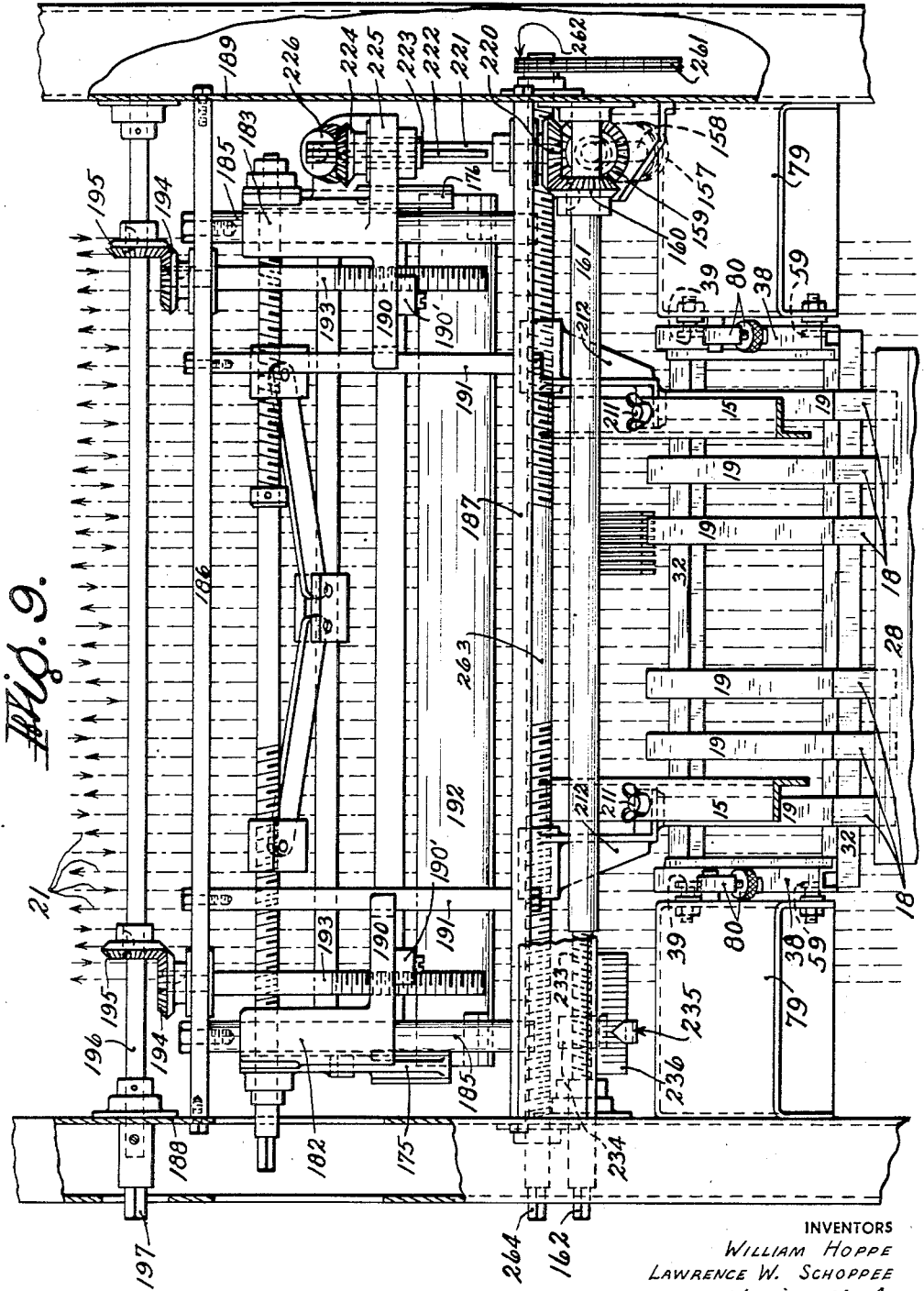

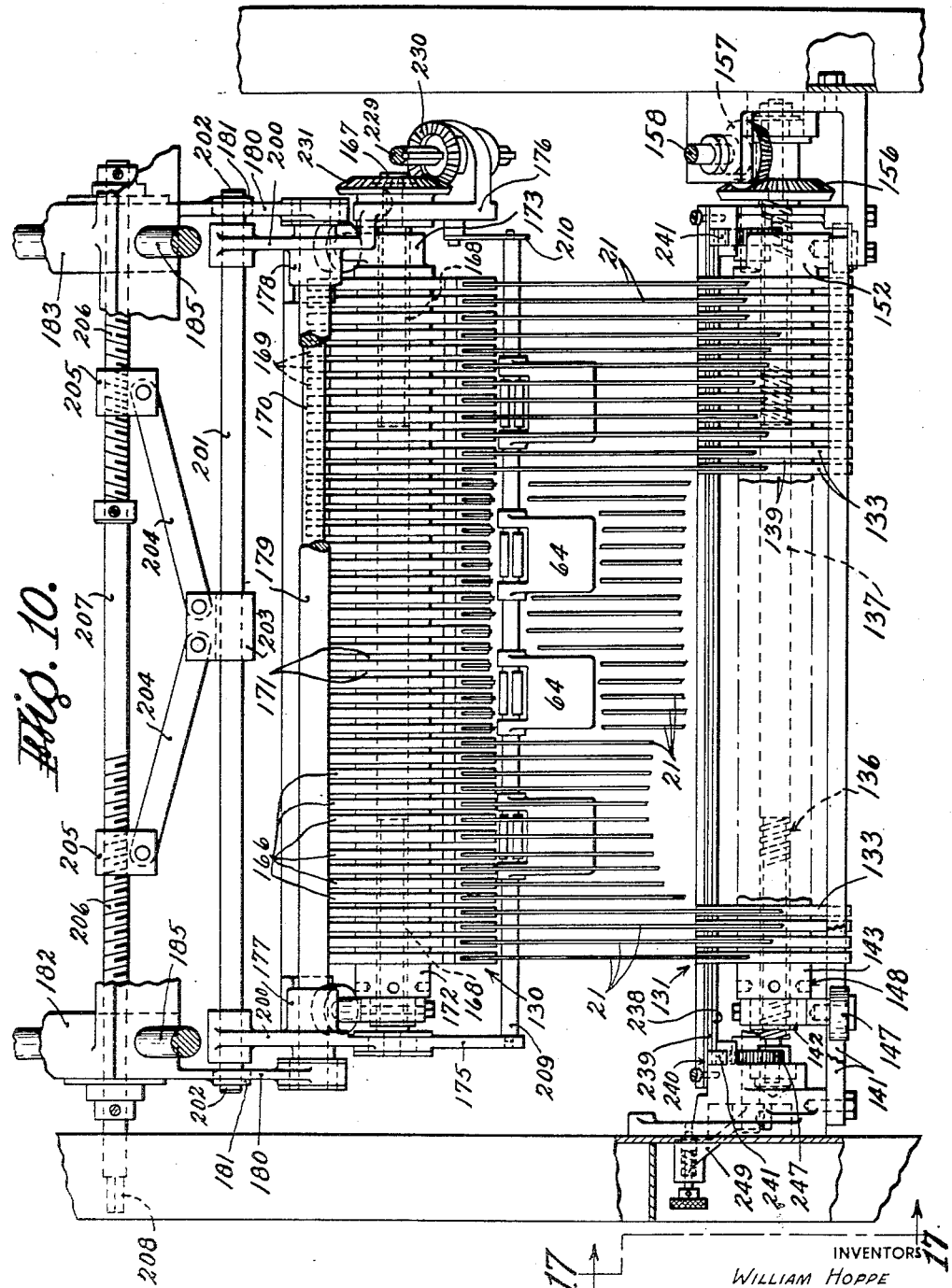

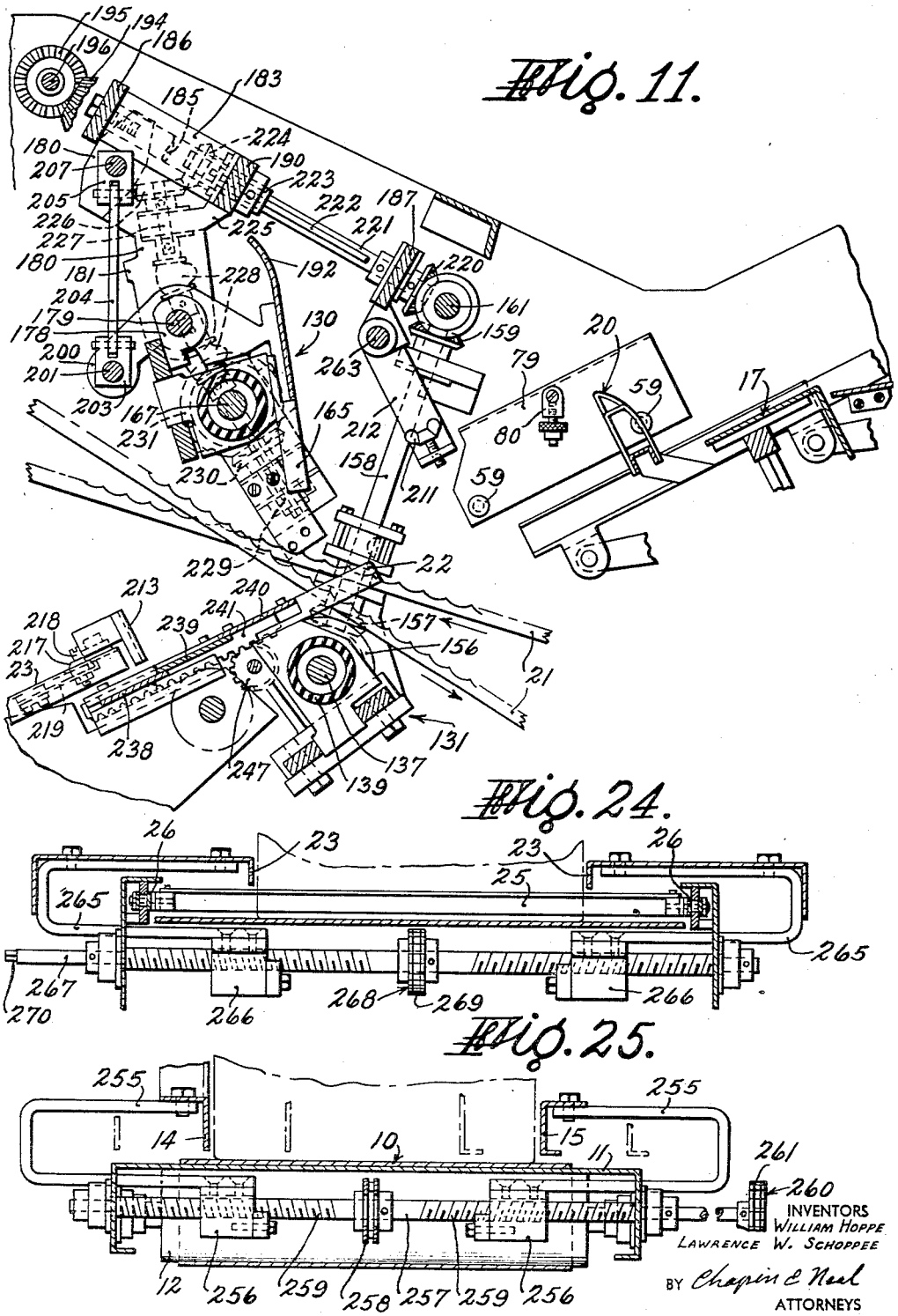

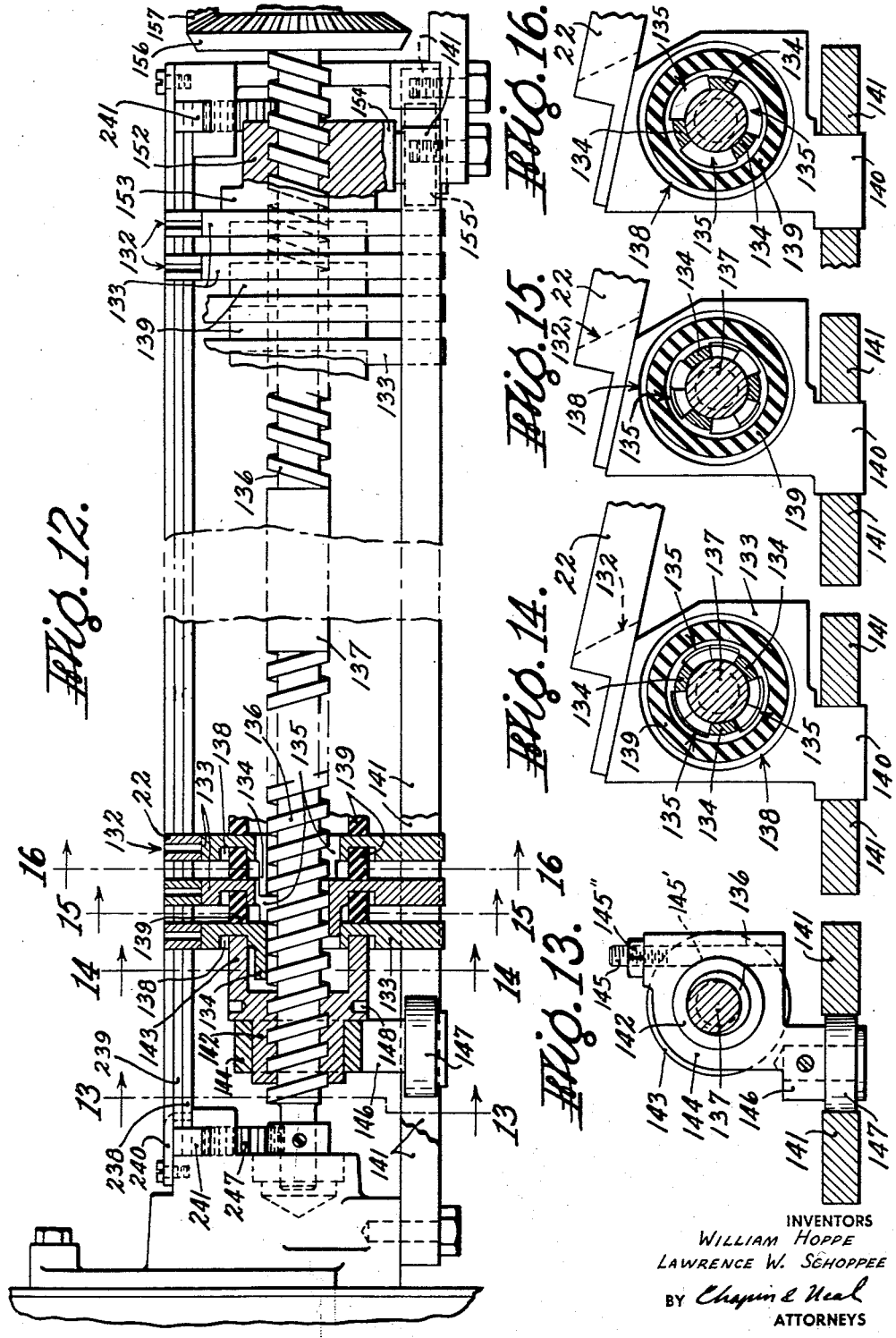

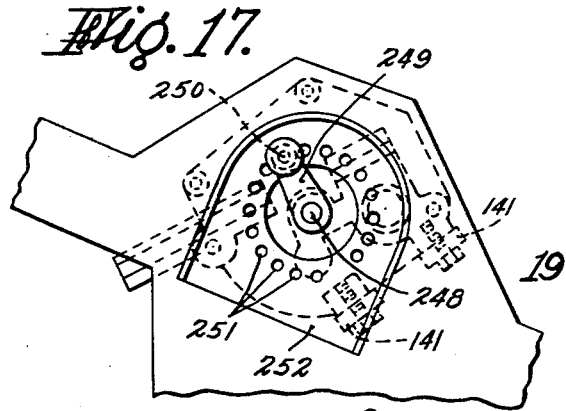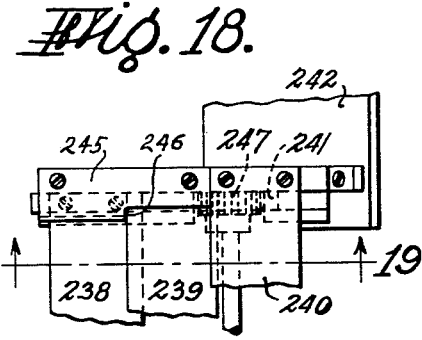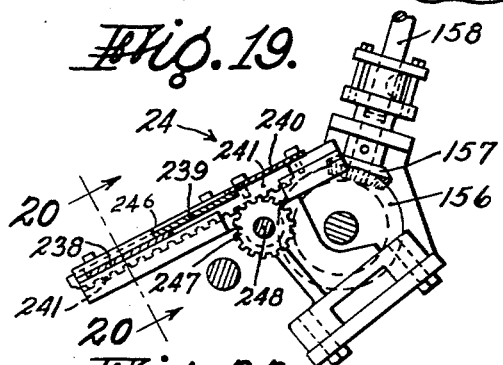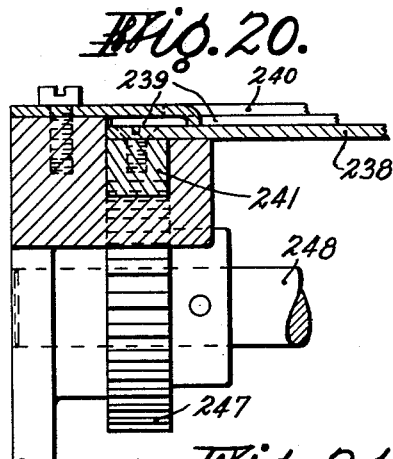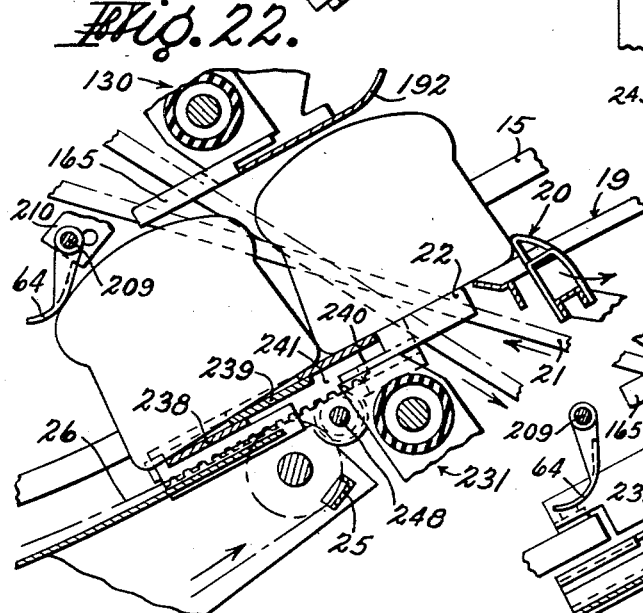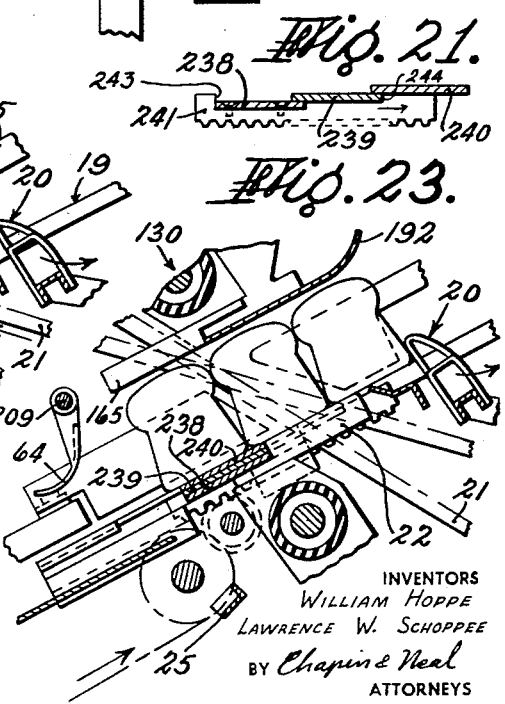
INVENTORS
WILLIAM HOPPE
LAWRENCE W. SCHOPPEE
BY Chapin & Neal
ATTORNEYS

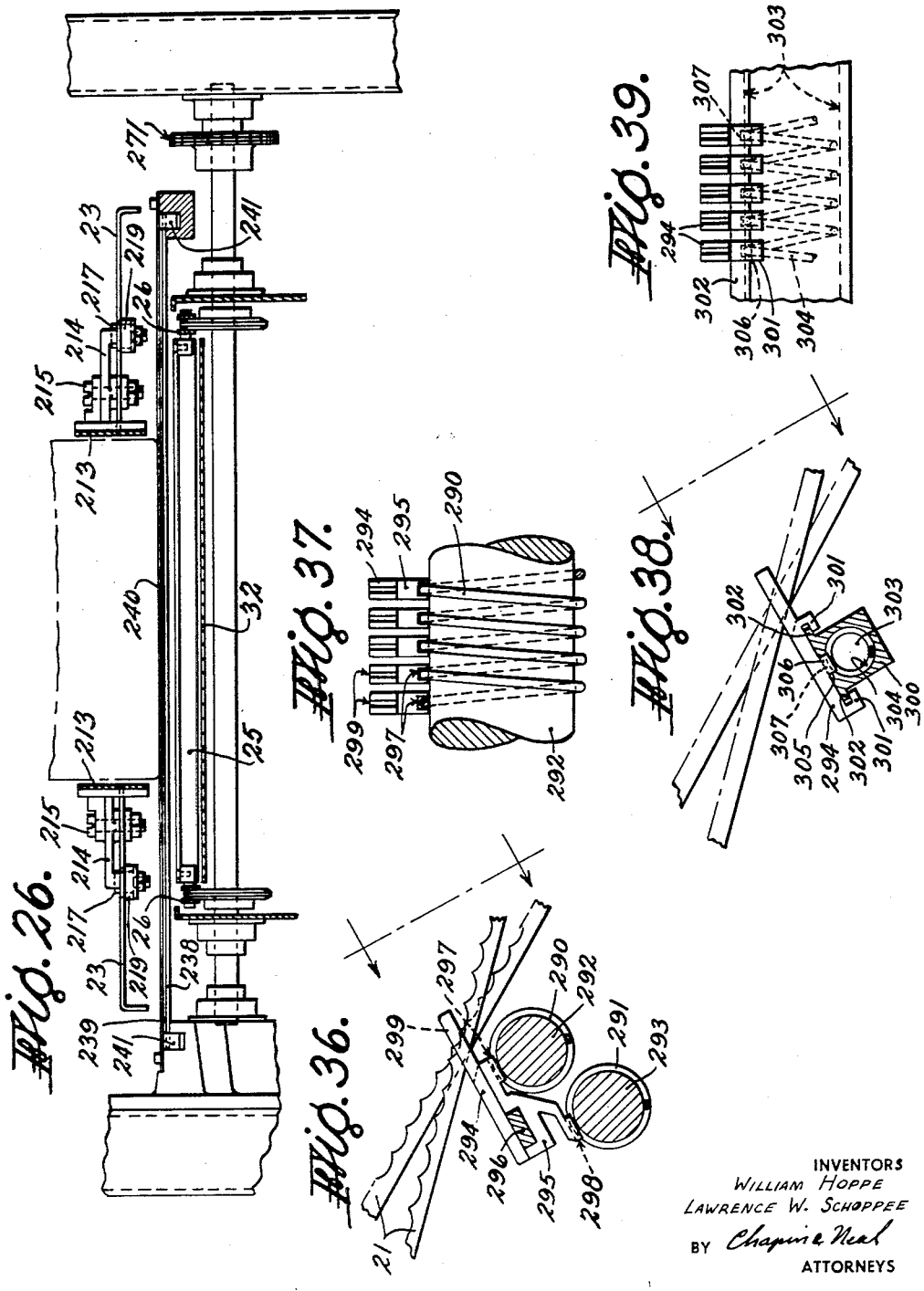

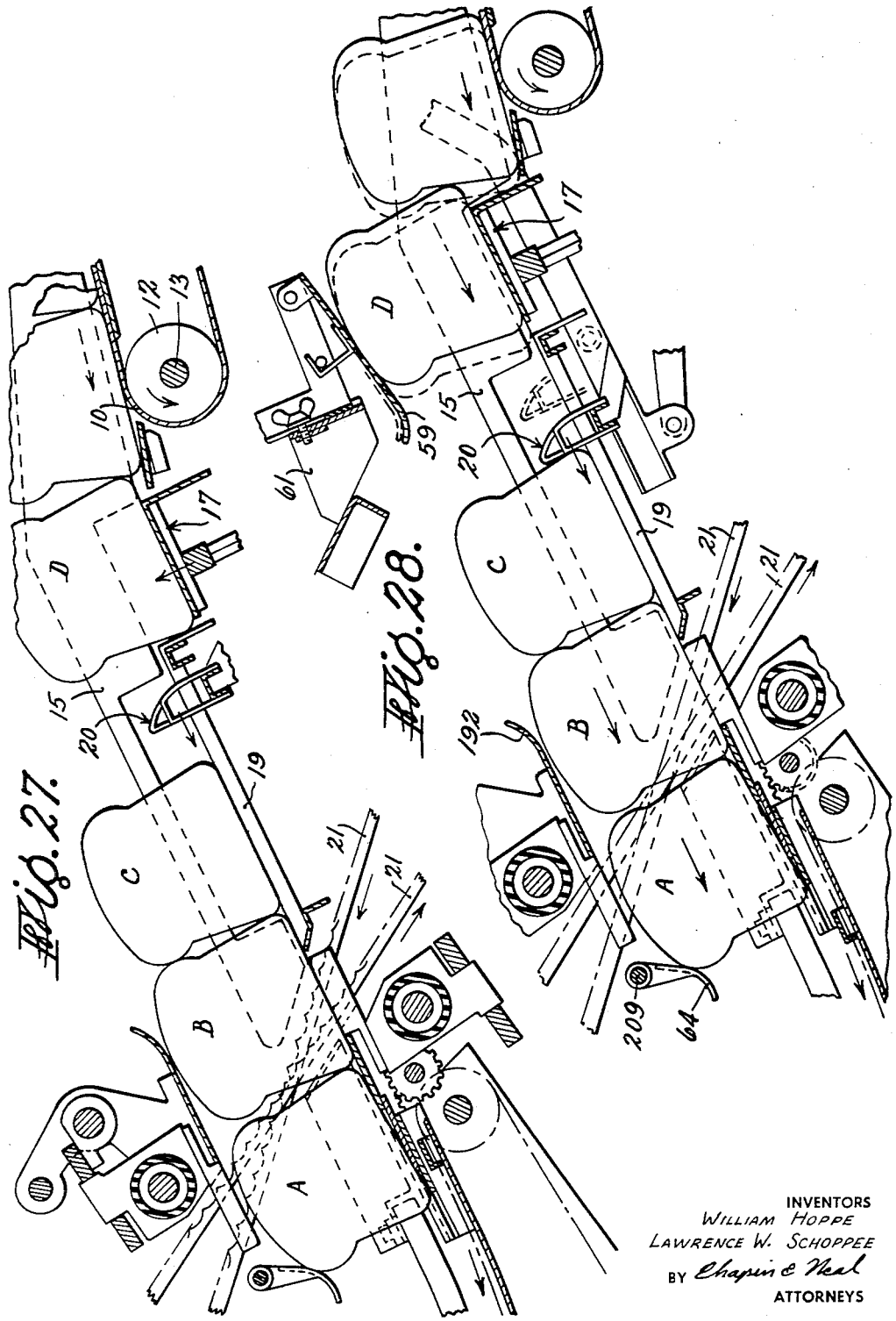

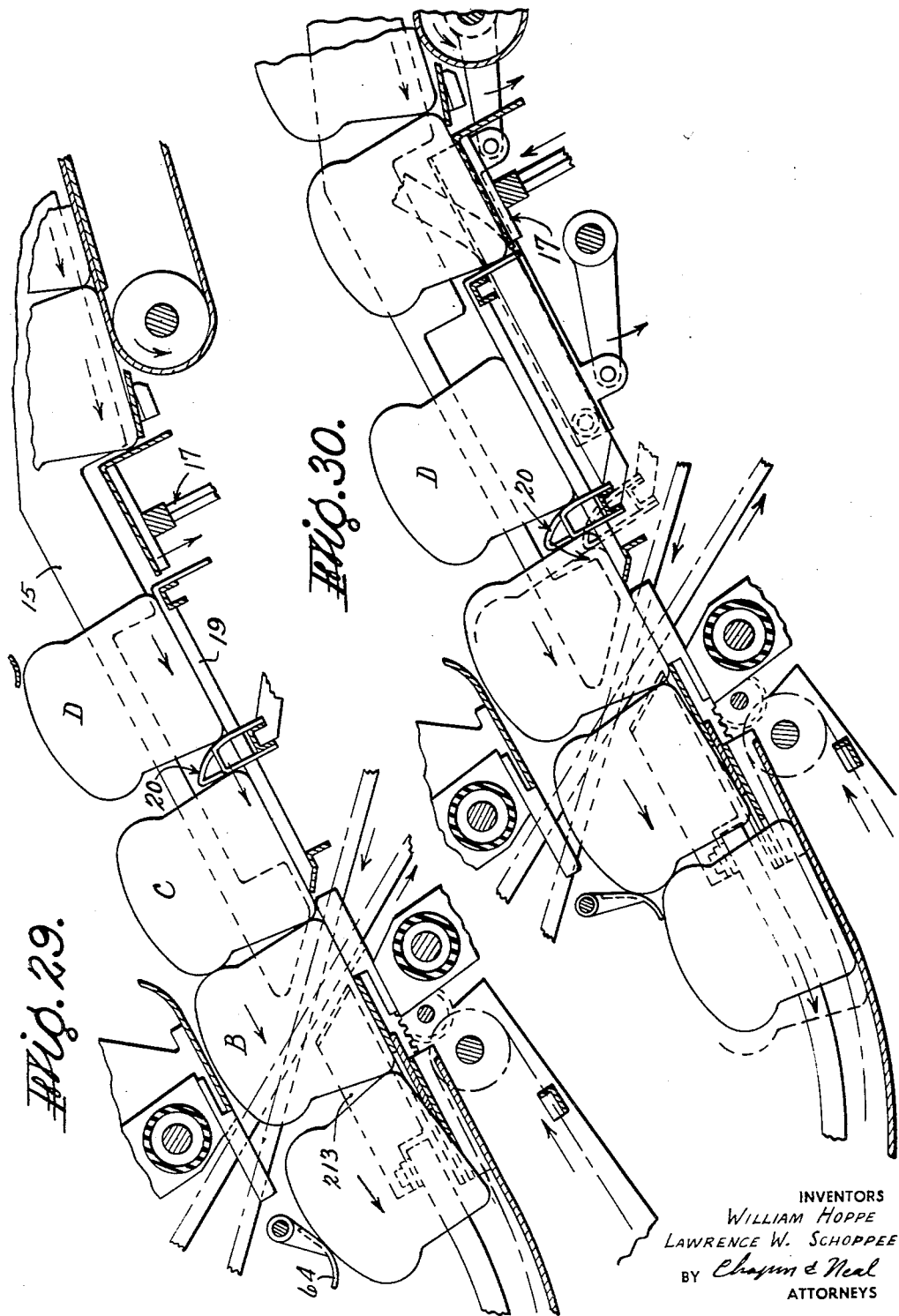

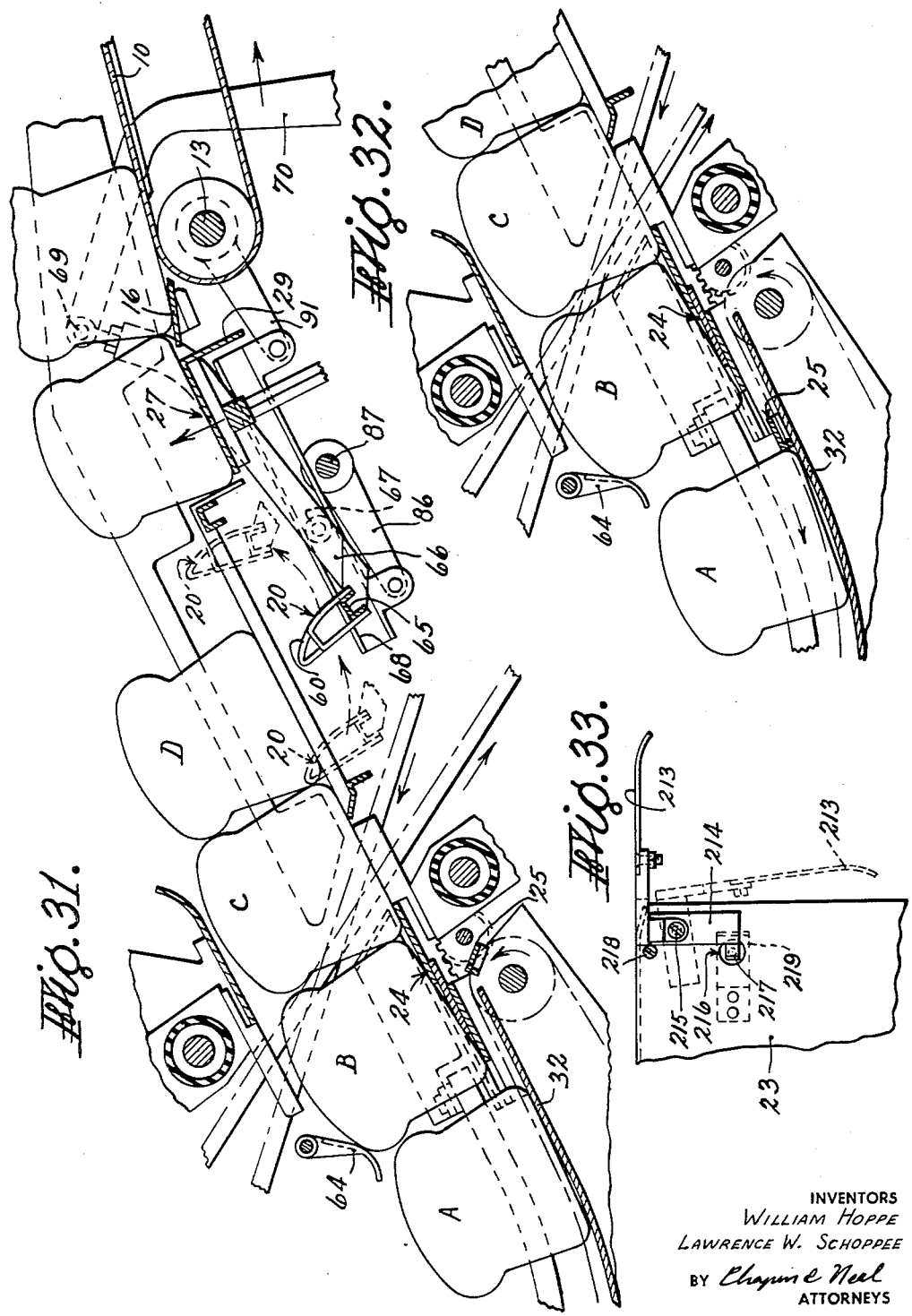

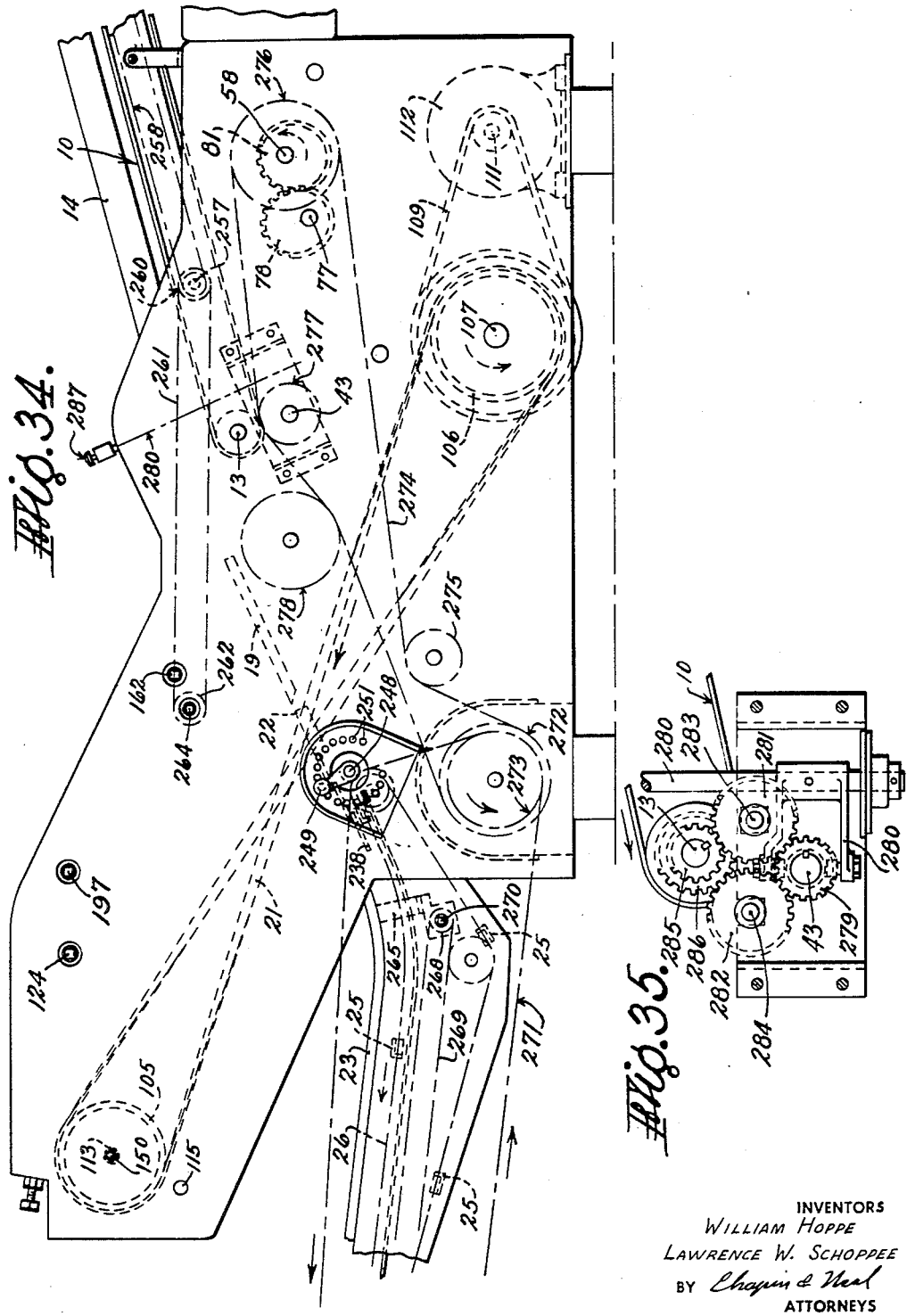

United States Patent Office 2,934,119
Patented Apr. 26, 1960

2,934,119

BREAD SLICING MACHINE

William Hoppe, Longmeadow, and Lawrence W. Schoppee, Springfield, Mass., assignors to Package Machinery Company, East Longmeadow, Mass., a corporation of Massachusetts Application June 4, 1956, Serial No. 589,284

3 Claims. (Cl. 146—88)

This invention relates to an improvement in machines for slicing loaves of bread prior to their delivery to a wrapping machine.

More particularly it relates to such machines of the type in which the slicing is accomplished by a plurality of constantly driven band saws, which pass around spaced pulley drums, the runs of the saw bands crossing intermediate the drums, and the saw bands being turned into substantially parallel spaced planes to effect cutting of the loaves by each run of each band saw.

A principal object of the invention is to provide a more efficient arrangement of the saw bands in relation to each other and the loaves to be sliced and for adjusting the spacing of the saw bands to thereby secure a more uniform and dependable operation.

A further object is to provide a more flexible operation better adapted to various slicing conditions.

Other and further objects residing in the details of the saw guiding and control devices and in the mechanism for feeding the loaves of bread to the saw bands will be made apparent in the disclosure of the accompanying drawings and in the following specification and claims.

In the accompanying drawings,

Fig. 3 is a detail sectional view substantially on line 3—3 of Fig. 1;

Fig. 4 is a sectional view substantially on line 4—4 of Fig. 1;

Fig. 5 is an enlarged sectional view substantially on line 5—5 of Fig. 4;

Fig. 6 is a sectional view substantially on line 6—6 of Fig. 4;

Fig. 7 is a sectional view substantially on line 7—7 of Fig. 1;

Fig. 8 is a sectional view substantially on line 8—8 of Fig. 1;

Fig. 9 is a sectional view substantially on line 9—9 of Fig. 1;

Fig. 10 is a sectional view substantially on line 10—10 of Fig. 2;

Fig. 11 is a view similar to Fig. 2 but showing only the left hand portion thereof on a larger scale;

Fig. 12 is a side elevational view partly in section of the lower saw band spacing means;

Fig. 13 is a sectional view substantially on line 13—13 of Fig. 12;

Fig. 14 is a sectional view substantially on line 14—14 of Fig. 12;

Fig. 15 is a sectional view substantially on line 15—15 of Fig. 12;

Fig. 16 is a sectional view substantially on line 16—16 of Fig. 12;

Fig. 17 is a detail view of the adjusting means for accommodating loaves of different size, looking substantially in the direction of the arrows 17—17 in Fig. 10;

Fig. 18 is a fragmentary plan view of the plates adjusted by the means of Fig. 17;

Fig. 19 is a sectional view substantially on line 19—19 of Fig. 18;

Fig. 20 is a sectional view on an enlarged scale substantially on line 20—20 of Fig. 19;

Fig. 21 is a detail sectional view of the plates, similar to Fig. 19;

Fig. 22 is a sectional view showing the device adjusted for the maximum size loaf;

Fig. 23 is a similar view showing the device adjusted for the smallest loaf;

Fig. 24 is a sectional view substantially on line 24—24 of Fig. 1;

Fig. 25 is a sectional view substantially on line 25—25 of Fig. 1;

Fig. 26 is a sectional view substantially on line 26—26 of Fig. 1;

Figure 2:
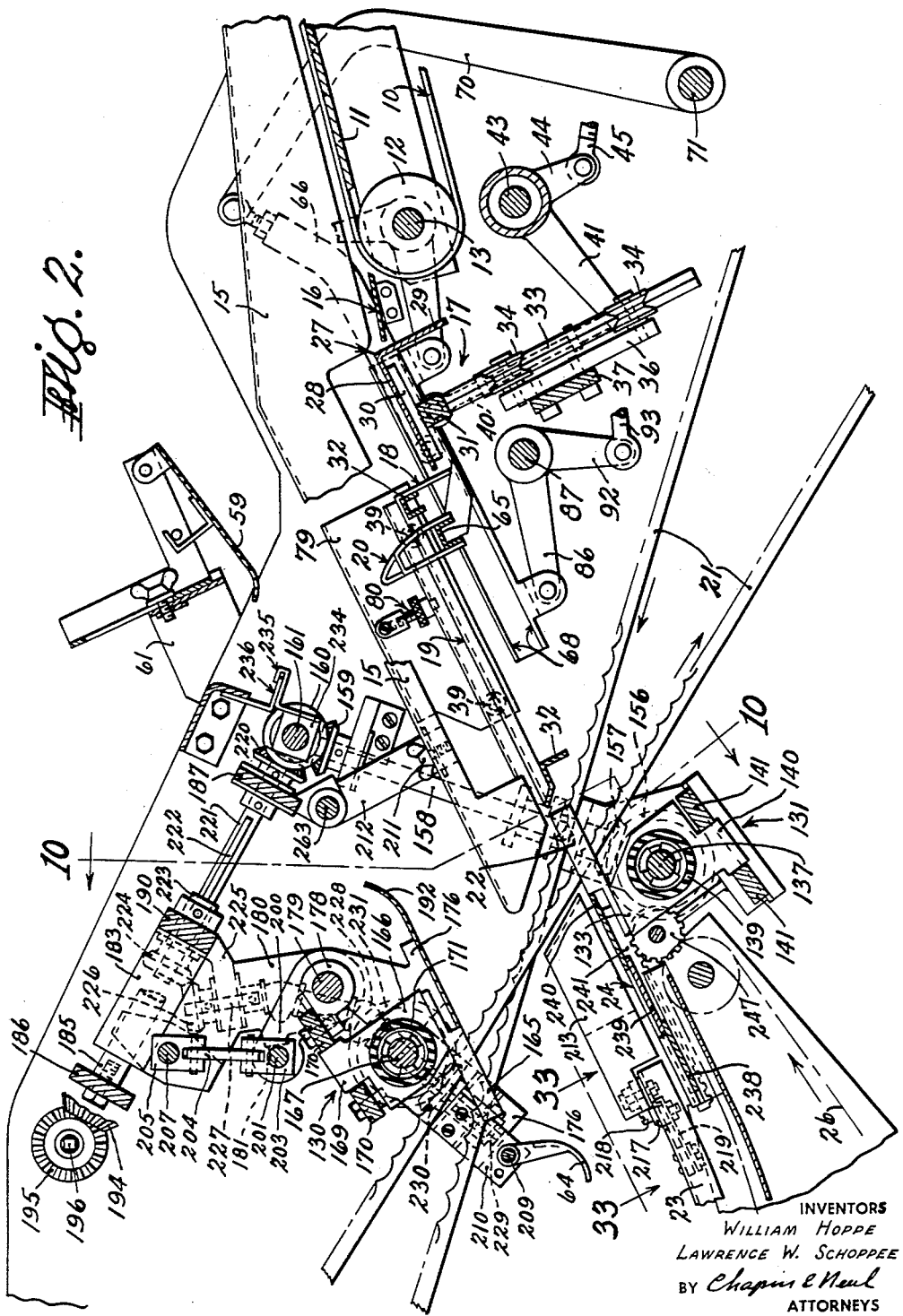
Fig. 2 is a view similar to Fig. 1, on a larger scale, showing features of the loaf feed and saw band guides.

Figs. 27 to 32 inclusive are similar side elevational views partly in section showing successive steps in the operation of the loaf feeding devices;

Fig. 33 is a detail plan view taken on the line 33—33 of Fig. 2;

Fig. 34 is a diagrammatic view showing the drives of several elements;

Fig. 35 is a detail elevational view of the means for changing the speed of the infeed conveyor, taken on the line 35—35 of Fig. 3;

Fig. 36 is a detail sectional view showing a modified form of the saw band spacing mechanism;

Fig. 37 is a view of the structure of Fig. 36 looking in the direction of the arrows in Fig. 36;

Fig. 38 is a view similar to Fig. 36 showing an alternative arrangement of the spacing means; and Fig. 39 is a view of the structure of Fig. 38 looking in the direction of the arrows in Fig. 38.

Figure 1:
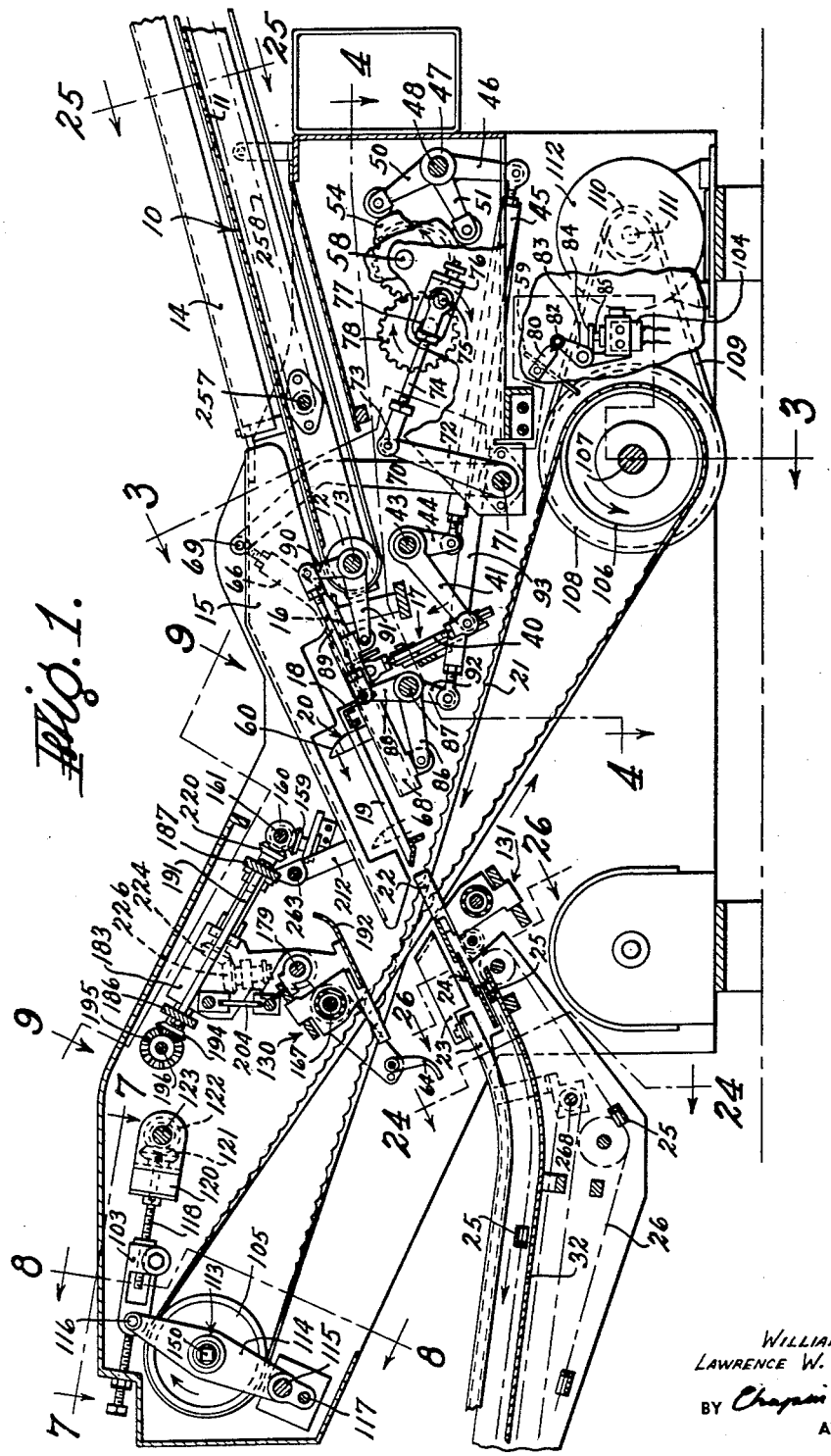
Fig. 1 is a side elevational view, parts being broken away and parts in section, of a bread slicing machine embodying the invention.

Referring to Fig. 1, the loaves of bread are supplied to the machine by a constantly driven belt 10, traveling over a plate 11 and around a pulley 12 fixed to a driven shaft 13. The belt 10 advances the loaves between side guides 14 and 15, over a bridging plate 16 and onto an elevator generally indicated at 17, which is of a dimension in the direction of bread travel to accommodate a single loaf. When the elevator is in lowered position as shown in Fig. 1 the loaf thereon engages stop members 18 carried at the ends of a plurality of inclined loaf supporting slats 19, thus temporarily arresting the line of incoming loaves, the belt 10 slipping beneath the latter. The elevator is periodically raised to deliver loaves onto the inclined slats 19 when, as later fully described, they are engaged by an oscillating pusher, generally indicated at 20, which pushes them through a plurality of driven slicing saw bands 21 which are adjustably held in cutting position by means later described which include a series of spaced fingers 22 which also support the loaves as they are sliced by the saws. From the slicing saws the sliced loaves pass between end guide plates 23 and over an adjustable plate assembly 24 later described, after which they are engaged by pusher flights 25 of a chain conveyor 26 and delivered to a suitable wrapping machine, not shown.

The elevator 17, as best shown in Figs. 2, 3, 4 and 6 comprises an angle plate 27 having a loaf supporting portion 28 and a downwardly extending portion 29 which latter engages the adjacent loaf and holds the incoming loaves back as the elevator moves upwardly. Plate 27 is carried by bars 30 supported on a cross head 31 which is fixed to the upper end of a six-sided rod 33. Rod 33 is guided for reciprocation in spaced sets of guide rolls 34 which, Figs. 4 and 6, engage opposite edges of rod 33. Rolls 34 are rotatably mounted on stub shafts 35 carried by brackets 36 fixed to a cross bar 37 of the frame.

Rod 33 and the elevator carried thereby are reciprocated by links 40, Figs. 1, 3, 4 and 6, which connect the ends of cross head 31 to respective arms 41 extending from a hub 42 pivoted on a cross shaft 43. Hub 42 is provided with an arm 44, Figs. 1 and 4 which is connected by a link 45 to an arm 46 extending from a hub 47 pivoted on a shaft 48. As best shown in Figs. 4 and 5 hub 47 carries arms 50 and 51 provided with respective cam rollers 52 and 53 which engage respective cams 54 and 55 fixed as by screws 56 to opposite sides of a hub 57 adjustably fixed to a shaft 58. Shaft 58 is constantly driven as later described.

The loaves of bread are successively raised by elevator 17 to the level of slats 19 and slide by gravity downwardly on the slats 19 toward the saw bands 21 through which the loaves are pushed by pusher 20.

The slats 19 are supported at their forward and rear ends by cross bars 32, Figs. 3 and 9 connected as by welding to the inner side members of inverted channel bars 38, the outer side members of the channel bars 38 being notched as at 39 to engage over studs 59 carried by brackets 79 bolted to the machine frame. The channel bars and slat assembly are releasably held on studs 59 by pivoted screw latches 80 so that the slat assembly may be removed as a unit for purposes later described.

As shown in Figs. 27 to 32, pusher 20 is oscillated in timed relation to the elevator and acts initially to advance three loaves from the same. In Fig. 27 the foremost, A, of the three loaves has almost completed its passage through the saws 21, another loaf B has partially engaged the same and a third loaf C has been discharged by the elevator and rests against the preceding loaf, and pusher 20 is positioned between loaf C and the elevator. In Fig. 28 the pusher 20 has advanced against loaf C to push the preceding loaves A and B through and into the saws and the elevator 17 has raised a loaf D to the level of rails 19. As the pusher 20 advances loaves A and B respectively through and into the saws, Fig. 29, loaf D slides down slats 19 into contact with the rear face of the pusher. When the two loaves B and C ahead of the pusher are engaged in the saw bands, the pusher is withdrawn downwardly and rearwardly, Figs. 30 and 31, permitting the loaf D at the rear of the pusher to join the engaged loaves, the pusher thereafter retreating and swinging upwardly and forwardly as shown in Fig. 31 to the position of Fig. 27 for a second cycle of operation. As shown in Fig. 28, as a loaf is lifted by the elevator it engages a pivoted hold down plate 59 adjustably secured to a bracket 61, and advances between side guides 15 and beneath a hold down plate 192 as it engages the saw bands. As shown in Figs. 31 and 32 the loaves, as they leave the saws, are engaged by one or more pivoted restraining fingers or plates 64 and following their delivery from plate assembly 24 to plate 32 are engaged by one of the conveyor pushers 25 for discharge from the machine.

Referring again to Figs. 1, 2 and 3, the pusher 20 comprises a transverse series of pusher fingers 60, Fig. 3, carried by a cross bar 65 which as best shown in Fig. 31 is fixed at its ends to links 66, which carry rollers 67 riding in guide channels 68 which channels are raised and lowered by a parallel linkage later described. Links 66, Figs. 1 and 3, are pivotally connected at 69 to the upper ends of arms 70 fixed to a rock shaft 71. Rock shaft 71, Figs. 1 and 4, carries an arm 72 which is pivotally connected at 73 to one end of a link 74, the other end of which is pivotally and adjustably connected at 75, Fig. 4, to a crank 76 fixed to a shaft 77. Shaft 77 carries an elliptical gear 78 keyed to said shaft. Gear 78 meshes with and is driven by an elliptical gear 81 keyed to driven shaft 58.

Referring again to Figs. 1 and 3 the guide channels 68 are respectively pivotally connected adjacent their forward ends to arms 86 of a pair of bell cranks fixed to a shaft 87, the other arms 88 of which are connected by links 89 to arms 90 of a second pair of bell cranks pivoted on shaft 13 and having their other arms 91 pivotally connected to the respective guide channels 68 adjacent the rear ends of the latter.

Shaft 87 carries an arm 92 connected by a link 93 to an arm 94, Figs. 4 and 5, extending from a hub 95 pivoted on rock shaft 48. Hub 95 carries arms 96 and 97 provided with respective cam rollers 98 and 99 which engage respective cams 100 and 101 carried by a hub 102 adjustably fixed to driven shaft 58, by which guide channels 68 are given a parallel up and down motion as the pushers 60 are reciprocated to impart the motion to the pushers above described. The elliptical gears 78 and 81 give a slow forward and a rapid return movement to the pushers.

Referring to Figs. 1, 3, 7 and 8 the saw bands 21 pass around spaced upper and lower drums 105 and 106, the lower drum shaft 107 carries a sprocket or pulley 108 connected by a chain or belt 109 to a sprocket or pulley 110 on shaft 111 of a motor 112. Shaft 113 on which the upper drum 105 is rotatably mounted, is adjustably mounted in any suitable manner to adjust the tension on the saw bands. As shown, shaft 113 is supported at one end in a frame including side members 114 pivoted on a cross shaft 115. The side members 114 are connected at their upper and lower ends by respective cross rods 116 and 117. The cross rod 116 is connected by adjustable links at each side of the machine, Fig. 7. Each link comprises a member 103 pivoted to rod 116 and a screw 118 threaded into the end of member 103. Each screw 118 is rotatably mounted in a bearing member 119 formed on a cross bar 120 and carries on its free end a bevel gear 121 meshing with a bevel gear 122 on a shaft 123. Shaft 123 has one end squared as at 124 to receive a wrench by which shaft 123 can be rotated to swing frame members 114 and drum 105 carried thereby about shaft 115 to adjust the tension on the saw bands. A stop screw 125 engages cross rod 116 to locate the drum in adjusted position.

The shaft 113 has one end fixed to one end frame 114 as indicated at 126, Fig. 8, the other end of the shaft being centrally recessed at 127 to releasably engage a supporting center 128 squared at 150 and threaded in a hub 129 carried by the adjacent end frame 114. In order to remove and replace the saws 21, center 128 is retracted by applying a wrench to the squared portion 150 and withdrawing center 128, thereby creating a space between drum 105 and arm 114 through which the saws may be passed. The same applies, see Fig. 3, to the lower drum 106 mounted on shaft 107 which also has a removable supporting center squared at 174 for removal as stated before.

In case a saw band should break, an emergency stop is provided in the form of a trip plate 59 which extends across the width of the machine spaced slightly above the bands as shown in Figs. 1 and 3 and mounted on a cross bar 79 pivoted between the side frames. An arm 80 attached to one end of bar 79 possesses a V notch on one end into which a roll 82 normally rests to keep plate 59 suspended as shown in Fig. 1. Roll 82 is carried by one arm 83 of a bell crank, the other arm 84 of which is holding down a plunger 85 of a motor switch 104 which maintains the contacts closed under normal conditions. Should a band break, it will hit plate 59 and cause roll 82 to lose its seat in the V notch of arm 80 and allow the bell crank 83—84 to rotate and allow the switch plunger 85 to rise and shut off the motor. An electric brake of the commercial type is mounted on the stationary shaft 107 (Fig. 3) generally indicated by 163 and is contained within one end of the lowermost band drum 106 and enclosed to be kept free of crumbs or dirt, etc.

To maintain the saw bands in desired spaced relation upper and lower guide assemblies respectively, generally indicated at 130 and 131, are provided.

Referring to Figs. 12 and 13, the lower saw guide assembly includes the fingers 22, which are provided at their free ends with slots 132 in which the saw bands respectively engage. Each finger 22 is carried by a plate 133 which is formed with a hub comprising three circumferentially spaced axially extending fingers 134, the fingers of adjacent hubs extending into the spaces 135 between the fingers of the next hub, as best shown in Figs. 12 through 16. The hub forming fingers 134 of each plate 133 slidably engage the surface of a square thread 136 formed on the end portions of a shaft 137, the threads 136 on opposite end portions of the shaft being oppositely pitched.

The plates 133 are formed on one side with annular grooves 138 in which one end of axially resilient cylindrical members 139 formed of rubber or similarly resilient material are engaged, the other end of the members 139 abutting the adjacent face of the adjacent plate 133. Each plate 133 is formed with an extension 140 engaging between spaced guide bars 141, suitably fixed to the machine frame, to restrain the plates from rotative movement about shaft 137.

Threaded on one end of shaft 137 is a nut 142 having an axially extending flange 143 engaging in groove 138 of the adjacent end plate 133. Nut 142 is held in a collar 144 provided with a smooth bore to receive a headless bolt 145, which is cut away at 145' to embrace a segmental portion of the nut and clamp the collar thereto when a nut 145'' threaded on bolt 145 is tightened against the collar. Collar 144 is formed with an extension 146 carrying a roll 147 engaging between the guide bars 141 to restrain the nut from rotation. Nut 142 is provided with sockets 148 for receiving a wrench by which the flange 143 may be brought into engagement with the adjacent plate 133 prior to the tightening of bolt 145 to secure collar 144 to the nut. A nut 152 is threaded on the opposite end of shaft 137 and is provided with a radial flange 153 engaging the adjacent face of the adjacent endmost plate 133. Nut 152 is provided with an extension 154 carrying a roll 155 engaging between bars 141 to restrain the nut from rotation.

Preferably and as shown resilient members 139 consist of resilient rubber cylindrical rings and as will be apparent upon rotation of shaft 137 in one direction the nuts 142 and 152 will be drawn together, deforming the resilient members 139 and bringing plates 133 and the saw guides carried thereby uniformly closer together thus reducing the thickness of the slices into which the loaves are separated by the saws. Rotation of the shaft 137 in the opposite direction permits expansion of the members 139 and a consequent uniform separation of the guides to produce thicker slices. Grooves 138 are wider than members 139 and hold the latter spaced from hub fingers 134 to permit free compressive deformation and expansion of the members. Shaft 137 carries a bevel gear 156 which meshes with a bevel gear 157 carried at the lower end (Figs. 2 and 10) of a shaft 158 the upper end of which carries a bevel gear 159 (Fig. 9) meshing with a bevel gear 160 fixed to one end of a shaft 161. The end of shaft 161 opposite gear 160 is squared as at 162 to receive a wrench by which shaft 161 may be rotated and thereby rotate shafts 158 and 137 to adjust the just described saw guides 22 toward or from each other to vary the thickness of slices into which the loaves are cut. Simultaneously the upper unit of saw guides 130, Fig. 2, are similarly adjusted, as later described.

The upper saw guides comprise a plurality of fingers 165 similar in all essential respects to fingers 22 just described, but extending in the opposite direction from the lower edges of plates 166 similar to plates 133 and similarly mounted on a shaft 167 which is similarly reversely threaded at its end portions, as diagrammatically indicated at 168, Fig. 10. The plates 166, as best shown in Fig. 2, are provided with extensions 169 engaging between guide bars 170 to prevent their rotation relative to shaft 167 and as shown in Figs. 2 and 10 are separated by resilient cylindrical ring members 171 similar in all respects to members 139, one end of the members 171 engaging in annular grooves (not shown) found in one face of each of the plates 166 and identical in purpose and function to the grooves 138 in plates 133. Nuts 172 and 173 substantially identical in structure to nuts 142 and 152 are threaded on the end portions 168 of shaft 167 to move plates 166 and their saw guides toward and from each other upon rotation of shaft 167 as described in connection with shaft 137.

Shaft 167 is journaled at its ends, Figs. 2 and 10, in plates 175 and 176 provided with bearing hubs 177 and 178, respectively, pivotally mounted on a pivot rod 179 journaled at its ends in plate extensions 180 respectively extending downwardly from carriages 182 and 183 slidably mounted on respective guide rods 185. As best shown in Fig. 9 guide rods 185 are secured between cross bars 186 and 187 suitably connected at their ends to the side frame members 188 and 189 of the machine frame. Carriages 182 and 183 are each provided with extensions 190 forked at their ends, the forks engaging bars 191, secured between cross bars 186 and 187 to prevent the carriages turning on rods 185. A loaf hold-down guide plate 192 (see also Fig. 2) extends between plates 175 and 176 and it is necessary to adjust plate 192 toward and from the loaves passing through the machine to accommodate loaves of different height. This adjustment is provided by threaded shafts 193 (Fig. 9) journaled adjacent their upper ends against longitudinal movement in cross bar 186, their lower ends passing freely through the extensions 190 of carriages 182 and 183 and making threaded engagement with respective half-nuts 190' fixed to the extensions. The upper end of each shaft 193 is provided with a bevel gear 194 meshing respectively with bevel gears 195 fixed to a cross shaft 196. One end of cross shaft 196 is squared as at 197 to receive a wrench by which shaft 196 may be rotated to simultaneously rotate shafts 193 to thereby move carriages 182 and 183 along their guide rods and move the parts carried thereby including hold-down plate 192 and saw guides 165 toward and from the path of the loaves. This adjustment of the saw guides toward and from the loaves assures that the guides will be effective closely adjacent the point where the blades enter and leave the loaves, assuring clean accurate cutting.

Provision is also made to swing the saw guides 165 clear of the saw bands as shown in Fig. 11, to enable easy removal and replacement of the saw bands.

To accomplish this movement of the saw guides 165 from the operative position of Fig. 2 to the inoperative position of Fig. 11, as best shown in Fig. 10, hubs 177 and 178 are provided with respective extensions 200 in which the end portions of a cross rod 201 are supported, the ends of the rod 201 extending outwardly beyond the extensions, as at 202. Mounted on rod 201 centrally thereof is a block 203 which forms the knee of a toggle, the arms of which comprise links 204 pivotally connected at their adjacent ends to block 203 and having their other ends pivotally connected to nuts 205 engaging on the oppositely threaded end portions 206 of a shaft 207 journaled at its ends against axial movement in plate extensions 180 of carriages 182 and 183. One end of shaft 207 is squared as at 208 for the application of a wrench by which the shaft may be rotated. As will be apparent when shaft 207 is rotated to draw the nuts 205 toward each other thereby decreasing the angle between the links 204 the cross rod 201 is forced downwardly, as viewed in Fig. 2, to swing the plates 175 and 176 and the parts carried thereby about shaft 179 from the position of Fig. 2 to the position of Fig. 11 where the guides 165 clear the saw bands. In the position of Fig. 2 the ends of rod 201 outward of plates 200 engage stop lugs 181 formed on the plates 180.

The fingers 64, previously referred to as pivoted on a rod 209 mounted at its ends in plate 175 and a bracket 210 releasably secured to plate 176, are removed prior to swinging the saw guides to the position of Fig. 11. As shown in Figs. 2, 9 and 11 the side guides 15 which are releasably secured as by wing screws 211 to hangers 212, adjustably threaded on shaft 263, are also removed. The slat assembly 19 is removed by releasing latches 80 as previously described, to permit removal of the saw bands from the lower guides. Also, discharge side guides 213 shown in a guiding position in Figs. 1, 2, 33 and 26 are swung open, as shown in Fig. 11 and the dotted position of Fig. 33, to allow saw guide assembly 130 to pass. Guides 213 are secured to an arm 214 pivoted at 215 on the main discharge loaf guides 23. A latch 217 and a stop 218 adjacent the extreme ends of arm 214 maintain guides 213 in their closed, guiding position. Latch 217 is maintained in a raised, guide-locking position by a leaf spring 219 secured to the underside of loaf guide 23 upon which latch 217 is mounted, through a hole 216 in guide 23. To open guides 213, latch 217 is depressed and arm 214 is swung over it to the dotted position shown in Fig. 33. A beveled edge on the front face of latch 217 permits the automatic closing of guides 213 by merely swinging them to their closed position.

To accommodate the adjustment of the carriages 182—183 toward and from the loaves and the swinging disengagement of guides 165 from the saw bands, a flexible drive for shaft 167 from shaft 161 is provided to permit the simultaneous adjustment of the upper and lower saw guides. Referring to Figs. 2 and 9, this drive comprises a bevel gear 220 meshing with bevel gear 160 on shaft 161 and fixed to the end of a shaft 221 journaled in cross bar 187. Shaft 221 is provided with a key or spline 222 which engages in a complementary keyway formed in the hub 223 of a bevel gear 224. The hub 223 of bevel gear 224 is journaled in a bracket 225 extending from carriage 183 and as the latter is adjusted on its guide rod 185 gear 224 stays in driven relation with shaft 221 through key 222.

Bevel gear 224 meshes with a bevel gear 226, Fig. 11, fixed to one end of a short shaft 227 journaled in bracket 225 and in constant mesh with gear 224. The other end of shaft 227 is connected by a suitable double universal joint 228 to a shaft 229 which carries a bevel gear 230 which meshes with a bevel gear 231 on shaft 167, Fig. 10. Thus both the upper and lower saw guides are transversely adjusted by rotation of shaft 161. For convenience as shown in Fig. 9 one end portion of shaft 161 is threaded as at 233 to receive a traveling nut 234 carrying a pointer 235 showing, on a scale 236, the degree of spacing of the saw guides.

As the loaves emerge from the saw bands they pass onto the adjustable plate assembly 24, previously mentioned. As best shown in Figs. 17 through 21 this plate assembly comprises three overlapping plates 238, 239 and 240. Plate 238 is fixed at its ends to racks 241 slidably mounted on opposite sides of the machine (Fig. 26), plate 240 is fixed at its ends to opposite brackets 242 fixed to the machine, while intermediate plate 239 is mounted for free sliding movement. Racks 241 are engaged by respective pinions 247 fixed to a cross shaft 248 which is provided at one end with one operating crank 249. The crank is provided with a spring pressed pin 250 releasably engaging in openings 251 formed in a plate 252. As will be apparent by rotation of pinions 247, by means of crank 249, the plates 238 and 239 may be moved from the extended position of Fig. 22 for the largest loaves to the position of Fig. 23 where plates 238 and 239 nest beneath plate 240 for the smallest loaves, or the plates may be held in any intermediate position by engaging pin 250 in the proper opening 251 to accommodate loaves of intermediate size. As rack 241 is moved in the direction of the arrow (Fig. 21) a shoulder 243 will hit plate 239 and move it along, stacked above plate 238, to the position shown in Fig. 23. On reverse movement a shoulder 244 on the rack will pick up plate 239 and push it along to the position shown in Fig. 22. Figs. 18 and 20 show a hold-down plate 245 which keeps plate 238 and the racks 241 down against gears 247 and also serves as a stop at 246, Figs. 18 and 19, for plate 239 on its return to wide open position as in Fig. 19. This adjustment assures that the loaf emerging from the saw bands will be supported clear of conveyor 26 and discharged onto the conveyor, by the advance of the succeeding loaf, in proper position to be engaged by a flight 25 of the conveyor.

The side guides for the loaves on the infeed and discharge conveyors are made adjustable for loaves of different length.

As shown in Fig. 25 the loaf guides 14 and 15 at the sides of infeed conveyor 10 are carried by pairs of brackets 255 secured to nut members 256 threaded on a shaft 257. Fig. 25 shows the forward pair of brackets and their adjusting shaft 257, the latter being connected by sprocket chain 258 to a similar shaft for adjusting the rear pair of side guide brackets, not shown, for common adjustment.

Shaft 257 has its end portions reversely threaded as at 259 (Fig. 25) so that the guides are moved toward or from each other on rotation of the shaft. Shaft 257 carries a sprocket 260 connected by a chain 261 to a sprocket 262 (Fig. 34) carried by a shaft 263, which carries hangers 212, to locate the point of adjustment of both hangers 212 and guides 15 adjacent the discharge end of the machine. By applying a wrench or crank to the squared portion 264 of shaft 263, infeed guides 14 and also 15 are simultaneously moved toward or from each other. Shaft 263 is reversely threaded (Fig. 9) and hangers 212 which carry guides 15 are threaded thereupon.

As shown in Fig. 24 the loaf guides 23 at the sides of the discharge conveyor 26 are carried by pairs of brackets 265 secured to nut members 266 threaded on a shaft 267. Fig. 24 shows the rear pair of brackets and their adjusting shaft 267, the latter being provided with a sprocket 268 connected by a chain 269 to a similar shaft for adjusting the forward brackets, not shown, for common adjustment of the forward and rear brackets. Shaft 267 has its end portions reversely threaded so that the guides 23 are moved toward or from each other when the shaft is rotated. The end of shaft 267 is squared as at 270 to receive a wrench or socketed crank.

The elevator 17, pusher 20, infeed conveyor 10 and discharge conveyor are driven as shown in Fig. 34 from the wrapping machine (not shown) by a chain 271 and a sprocket 273 secured to a shaft upon which a sprocket 272 is also mounted. A chain 274 passes around sprocket 272, over an idler 275, a sprocket 276 fixed on shaft 58, which drives the elevator 17 and pusher 20, a sprocket 277 on shaft 43 and beneath an idler 278. Shaft 43, see Figs. 3 and 35, has a pinion 279 slidably splined on the end of shaft 43 opposite sprocket 277. Pinion 279 is adapted to be moved by a suitable shifter, generally indicated at 280, selectively into mesh with gears 281 or 282 mounted in respective stub shafts 283 and 284. Gears 281 and 282 mesh respectively with gears 285 and 286 fixed to the end of pulley shaft 13 of the infeed conveyor. Gears 285 and 286 are respectively of relatively small and large diameter by which the infeed conveyor is driven at a relatively high or low speed. The shifter 280 possesses a spring pressed detent 287 which engages either of two holes in the frame to maintain the desired speed.

Figs. 36 and 37 show an alternative arrangement for maintaining a uniform spacing of the saw guide as the latter is adjusted for thicker or thinner slicing. In the arrangement of Figs. 36 and 37 the rubber members 139, previously described, are replaced by the convolutions of coiled sprinngs 290 and 291 freely telescoped over shafts 292 and 293, respectively. The saw guide fingers 294, similar in structure and function to fingers 22 previously described, are carried by supports 295 slidably mounted on a cross guide 296 for movement toward and from each other. The supports 295 for the fingers 294 are provided with grooves 297 and 298 respectively engaging the convolutions of springs 290 and 291 whereby as the outermost saw guide fingers 294 are moved toward or from each other, by suitable means not shown, the springs are compressed or permitted to expand, the fingers being carried thereby uniformly closer together or further apart, thus reducing or increasing the thickness of the slices into which the loaves are separated by the saw bands 21 running in the grooves 299 in the ends of the fingers.

Figs. 38 and 39 show a modification of the arrangement just described in which the guide fingers 294 are slidably mounted on a rectangular bar 300 and are provided with opposed hook members 301 engaging beneath flanges 302 extending along the upper edges of bar 300 to properly guide the fingers along the bar. The bar 300 is cored as at 303 to receive a coiled spring 304, the upper face of the bar being formed with a slot 305 through which the convolutions of spring 304 are accessible. The fingers 294 are provided with respective lugs 306 formed with grooves 307 engaging over adjacent convolutions of spring 304 whereby as the outermost saw guide fingers 294 are moved toward or from each other by suitable means, not shown, the spring 304 is compressed or permitted to expand, the fingers being carried thereby uniformly closer together or farther apart to adjust the thickness of the slices cut by the saw.

As will be apparent, the convolutions of the springs in the forms just described or the rubber rings 139 previously described form resilient means positioned between the saw guide fingers, providing uniform adjustment of the slice thickness by simply moving the outermost of the series of saw guide fingers toward or from each other in the range of compression and expansion of the intervening resilient members.

The combination above described provides an advantageous and superior control of the operative elements in the operation of the machine and results in a more accurate and uniform product.

As is apparent the saw bands make an obtuse angle with respect to the path of the loaves so that the line of cut of the saws is diagonally of the loaves from the leading lower corner of the loaf to the trailing upper corner, the stroke of the oscillating pusher 20 being such that two loaves are normally in engagement with the saw bands on the return movement of the pusher, thus maintaining the position of the loaves. The manner of adjusting the spacing of the saw bands' guide fingers, to vary the thickness of the slices makes such adjustment possible while the machine is in operation or without substantial interruption thereof and makes it possible to swing the upper guides as a unit clear of the saws while maintaining the setting of the guide fingers. Similarly the adjustment of the upper set of saw guide fingers to and from the lower set and the adjustment of the loaf support beyond the saw bands to accommodate loaves of various sizes is accomplished without interruption of the machine operation.

What is claimed:

1. In a machine for slicing loaves of bread of the type including a plurality of endless saw bands trained around spaced drums with the runs of said bands crossing intermediate said drums, means to drive one of said drums, and upper and lower guide means, positioned in parallel planes and between which the loaves are advanced, engaging the runs of the saw bands to position the portions of the latter between said guide means in spaced parallel planes with their cutting edges in the path of the advancing loaves; said upper and lower guide means each comprising a set of fingers at least equal in number to the runs of the saw bands and each provided with an open ended guide slot in which a band run travels, a support for each set of fingers and upon which the fingers are mounted for relative movement longitudinally of the support, compressible and expansible means positioned intermediate the adjacent fingers of each set, each said support including a shaft rotatably mounted thereon and reversely threaded at its opposite end portions, a nut member threaded on each said portion in engagement with the endmost fingers of the set carried by the support, means to prevent rotation of said members relative to the shafts, a drive shaft, a driving connection between said drive shaft and the threaded shaft of the lower set of band guide fingers, a carriage in which the support for the upper set of bands guide fingers is pivotally mounted, supporting means upon which said carriage is slidably mounted for movement toward and from the lower set of band guide fingers, a gear rotatably mounted in said carriage, a shaft to which said gear is slidably splined to be driven thereby in all positions of the carriage, means to drive said last-named shaft from said drive shaft, and a flexible drive connection between said gear and the said threaded shaft of the upper set of band guide fingers, whereby threaded shafts of each set are simultaneously rotated upon rotation of the said drive shaft, to move said nut members on each threaded shaft toward and from each other to compress or expand the said compressible and expansible means between the fingers of both sets to simultaneously adjust the spacing of said fingers and of the saw band runs engaged thereby.

2. A machine for slicing loaves of bread as recited in claim 1, said compressible and expansible means comprising resilient rubber members.

3. A machine for slicing loaves of bread as recited in claim 1, said compressible and expansible means comprising a coiled spring and means carried by said fingers respectively engaging successive convolutions of the spring.

References Cited in the file of this patent

UNITED STATES PATENTS

| | | |
|---|---|---|
| 2,110,290 | Criner | Mar. 8, 1938 |
| 2,179,798 | Petskeyes | Nov. 14, 1939 |
| 2,208,315 | Walmer | July 16, 1940 |
| 2,225,600 | Kottmann | Dec. 17, 1940 |
| 2,297,710 | Kottmann et al. | Oct. 6, 1942 |
| 2,379,911 | Kottmann | July 10, 1945 |
| 2,759,510 | Hartman | Aug. 21, 1956 |

FOREIGN PATENTS

| | | |
|---|---|---|
| 478,532 | Great Britain | Jan. 20, 1938 |
| 604,071 | Great Britain | June 28, 1948 |